June 13, 1950             J. MERCIER            2,511,362
AIRCRAFT VARIABLE AREA WINGS USING
LANDING GEAR FAIRINGS Filed Feb. 24, 1948                            2 Sheets-Sheet 1

INVENTOR
JEAN MERCIER

By Adams & Bush
ATTORNEYS

June 13, 1950 J. MERCIER 2,511,362
AIRCRAFT VARIABLE AREA WINGS USING
LANDING GEAR FAIRINGS
Filed Feb. 24, 1948 2 Sheets-Sheet 2
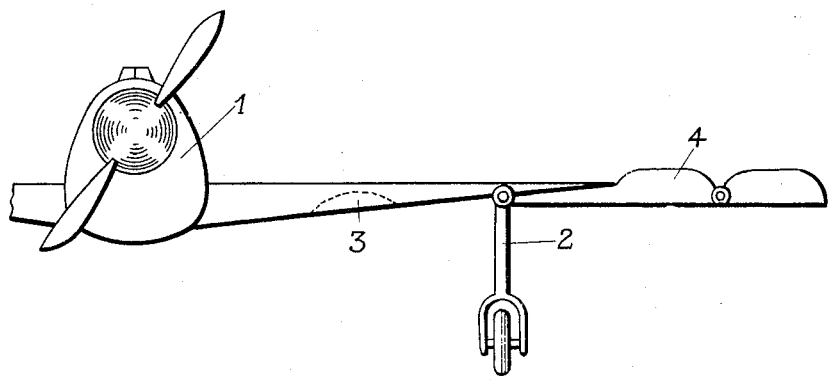
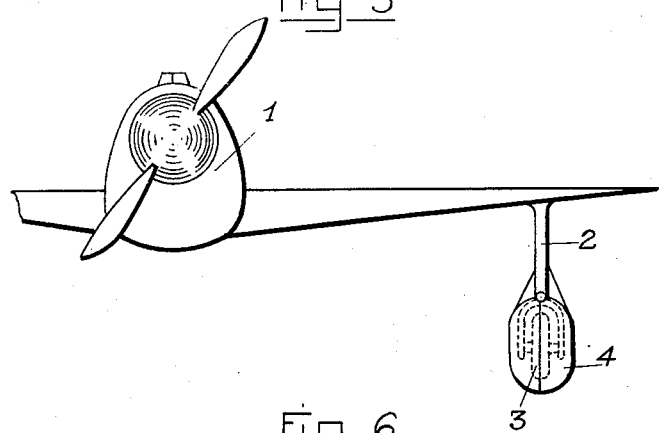
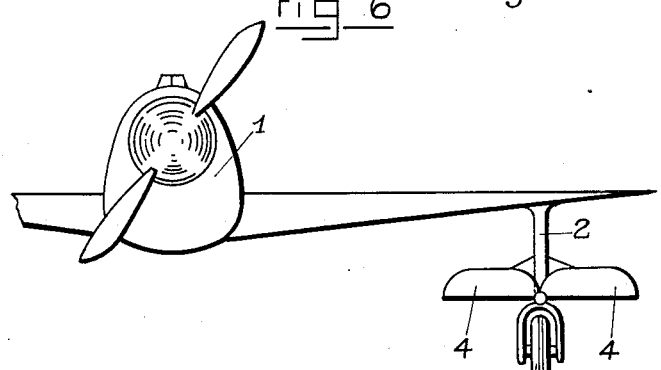
INVENTOR
JEAN MERCIER
BY Adams + Bush
ATTORNEYS Patented June 13, 1950

2,511,362

UNITED STATES PATENT OFFICE 2,511,362

AIRCRAFT VARIABLE AREA WINGS USING LANDING GEAR FAIRINGS

Jean Mercier, Paris, France

Application February 24, 1948, Serial No. 10,503
In France December 20, 1938

Section 1, Public Law 690, August 8, 1946
Patent expires December 20, 1958

4 Claims. (Cl. 244—102)

My invention relates to aircraft, and in particular, to fairing for landing gear which may be displaced into a position to substantially increase the effective area of the aircraft structure.

The landing of aircraft, particularly the landing of aircraft designed to fly at high speed, is always a delicate operation, considering the minimum speed below which the aircraft cannot descend and at which they must land. The fact is that a high speed airplane is essentially characterized by a relatively small lifting surface, which is not consistent with a landing or a take-off at moderate speed.

Various methods have been employed to cause changes of the magnitude and distribution of this lifting surface or effective wing area.

The present invention offers a manner of meeting this problem which is particularly simple and effective. The present invention is characterized in the fact that it employs as an auxiliary wing supporting surface, the streamlined surface or covering panels, or fairing, covering the wheels or landing gear, suitably arranged.

The invention will be understood from the following specification and the accompanying drawings showing several embodiments of the present invention, and wherein:

Fig. 4 shows a further modification of the construction of Fig. 1, wherein duplicate fairing members are provided, positioned end to end, one of which actually covers the landing gear when retracted, to constitute further additional lifting area;

Fig. 5 shows an application of the invention to an aircraft having non-retractable landing gear fixedly mounted on the wing, and having fairing members displaceably mounted for movement into and away from position for covering the terrain engaging member, the fairing members being shown in position engaging the terrain engaging member; and Fig. 6 shows the construction of Fig. 5, with the fairing members projected into position remote from the terrain engaging member, and constituting additional lifting area.

My invention provides for substantially increasing the lifting area of aircraft at the time when its speed is necessarily reduced during landing and take-off, and when the landing gear is moved down into terrain engaging position.

Figure 1:
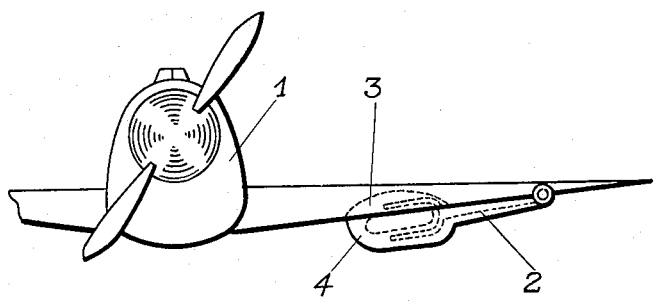
Fig. 1 shows a manner of applying the displaceable fairing of the present invention to an aircraft provided with retractable landing gear, the landing gear and fairing being in retracted position.

Referring to the drawings in detail, Fig. 1 shows in elevation an aircraft 1 provided with a retractable landing gear 2, which, in flight, is received in a recess 3 provided in the wing, a streamlined covering surface or fairing 4 covering up the landing gear 2 when it is in retracted position during flight.

Figure 2:
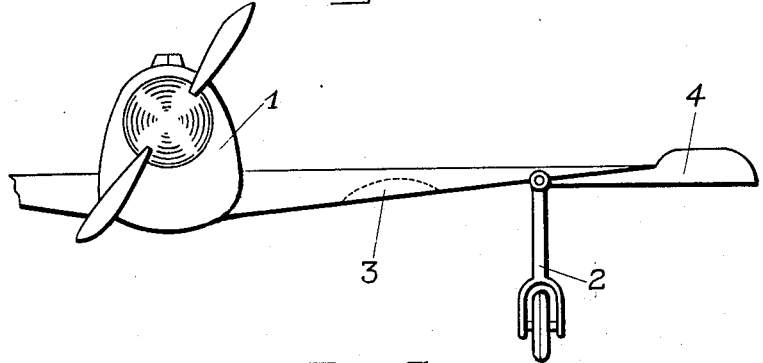
Fig. 2 shows the aircraft of Fig. 1, with the landing gear in terrain engaging position and the fairing extended beyond the wing tip to constitute additional lifting area.

Fig. 2 shows the landing gear of Fig. 1 withdrawn from retracted position and placed down into terrain engaging position, ready to land. The streamlined covering surface or fairing 4 has been rotated through an angle of about 180° from the retracted position of Fig. 1, and is extended horizontally, and its surface is added to the lifting surface of the wing. In the construction shown, the fairing 4 is mounted for pivotal movement about the same point on the wing about which the retractable landing gear pivots.

Figure 3:
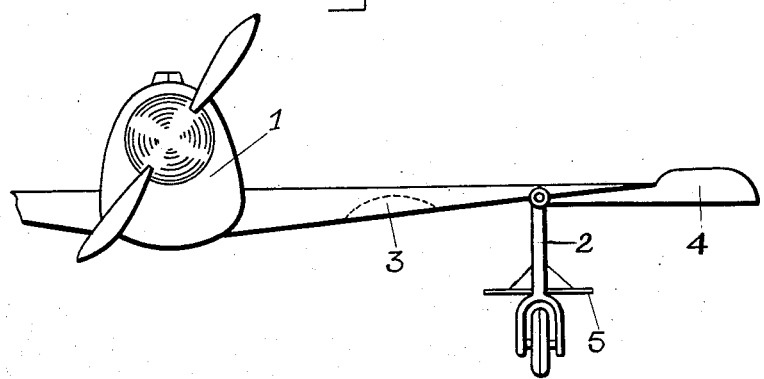
Fig. 3 shows a modification of the construction of Fig. 1, wherein additional lifting area is secured by displaceably mounting an additional plate on the landing gear immediately above the terrain engaging member.

Fig. 3 shows a modified form of the retractable construction of Figs. 1 and 2, consisting in providing the landing gear with an adjustable plate or movable panel 5, which is displaceably mounted on the connecting member connecting the terrain engaging member to the wing, and may be swung to be close and parallel to this connecting member, or may be swung substantially perpendicular to this connecting member, as shown in Fig. 3, in which latter position it still further substantially increases the lifting surface of the aircraft.

Fig. 4 shows another example of a modification of the retractable landing gear construction shown in Figs. 1 and 2, and wherein the streamlined covering surface or fairing covering the wheel or terrain engaging member is constituted of two separate shell members which are positioned end to end at the time of landing, and one of which in retracted position covers up the landing gear when the latter has been retracted into the recess 3. This double structure still further increases the effective lifting area of the aircraft.

Fig. 5 shows in flight position, a fixed non-retractable landing gear of an aircraft. In this position, two covering shells or fairings 4, 4, form a perfect streamlined covering surface or fairing for the wheel or terrain engaging member 3, covering the latter.

Fig. 6 shows the positions into which the fairings 4, 4, of the construction of Fig. 5, have been moved by suitable control means at the time of landing or at the time of take-off, in which position, the fairings 4, 4, do not interfere with the terrain engagement by the wheel, and substantially increase the effective lifting surface of the aircraft.

The present invention is applicable to aircraft employing retractable landing gear of any kind.

Suitable control means, as jacks and rods, is provided for displacing the fairing from the engaging position engaging the terrain engaging member, into extended position remote from the terrain engaging member and constituting additional lifting area. In the constructions of Figs. 1-4, on aircraft having retractable landing gear, it is decidedly preferable to employ suitable common control means for displacing both the fairings and the landing gear from their respective retracted positions into their extended positions, wherein they respectively are terrain engageable and constitute additional lifting area.

It is preferable that the angle of tilt of the fairings in extended lifting position, and of the wings proper of the aircraft, be given such a value in design that there is obtained maximum lift at relatively low speed.

It will be apparent to those skilled in the art that my invention is susceptible of modifications to adapt the same to particular conditions, and all such modifications which are within the scope of the appended claims I consider to be comprehended within the spirit of my invention.

Having thus described the invention, what is claimed is:

1. In an aircraft comprising a wing, retractable landing gear comprising a terrain engaging member, first mounting means for pivotally mounting said landing gear on a determined point of said wing selectively displaceably into retracted position or into landing position, fairing for said landing gear, second mounting means for pivotally mounting said fairing on said determined point of said wing selectively displaceably into a retracted position covering said landing gear in its retracted position or into a disengaged position remote from the landing position of said landing gear, said fairing in its said disengaged position extending beyond the tip of said wing and constituting additional wing area for said aircraft, and common control means for displacing said landing gear and said fairing into either of their said respective positions.

2. An aircraft according to claim 1, and a plate member pivotally mounted on said first mounting means immediately above said terrain engaging member and being selectively displaceable into a position substantially parallel to said wing or into a position substantially parallel with said first mounting means, said plate member in its said position parallel to said wing constituting additional wing lifting area for said aircraft.

3. An aircraft according to claim 1, said fairing comprising a pair of similar shell members mounted as a unit end to end, one of said shell members in the retracted position of said fairing being positioned to cover said landing gear in its said retracted position.

4. In an aircraft comprising a wing, landing gear comprising a terrain engaging member, first mounting means for fixedly mounting said landing gear on said wing in terrain engaging position, a pair of fairing members, second mounting means for pivotally mounting said fairing members on said first mounting means selectively displaceably into an engaging position covering said landing gear and its terrain engaging member or into a disengaged position substantially perpendicular to said engaged position, said fairing members in said disengaged position constituting additional wing area for said aircraft, and control means for selectively displacing said fairing members into either of their said selective positions.

JEAN MERCIER.

REFERENCES CITED

The following references are of record in the file of this patent:

UNITED STATES PATENTS

| Number | Name | Date |
|---|---|---|
| 1,546,853 | Methlin | July 21, 1925 |
| 1,776,768 | Adams | Sept. 30, 1930 |
| 2,153,266 | Minshall | Apr. 4, 1939 |

FOREIGN PATENTS

| Number | Country | Date |
|---|---|---|
| 849,813 | France | July 10, 1939 |